Figure 1:
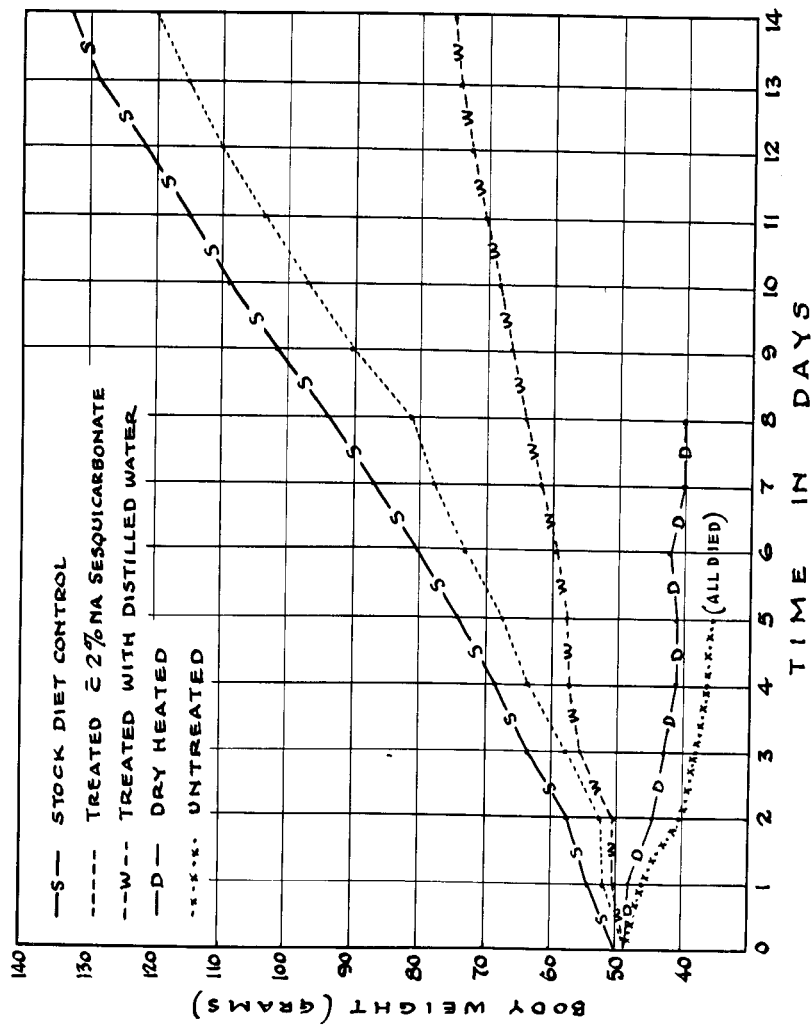
Figure 2:
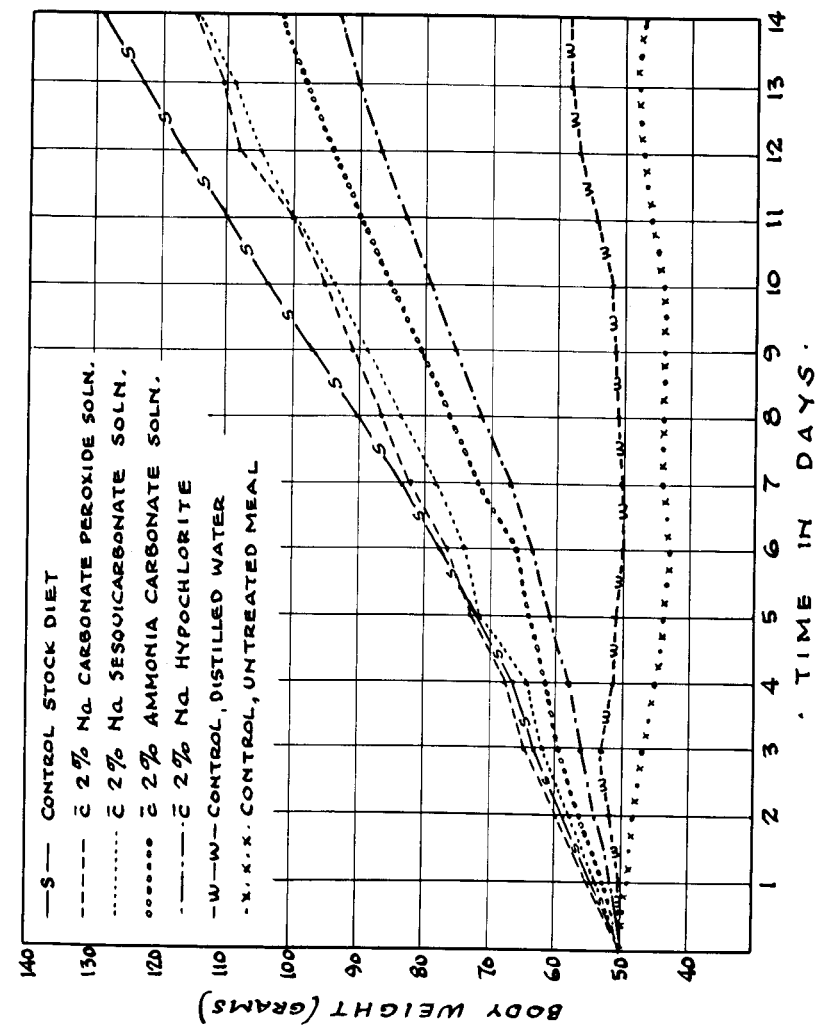

April 3, 1956 E. EAGLE ET AL 2,740,718
SEED MEAL DETOXIFICATION
Filed Oct. 3, 1951 3 Sheets-Sheet 2

INVENTORS
Edward Eagle
Frank A. Norris
BY R. G. Story
ATTORNEY

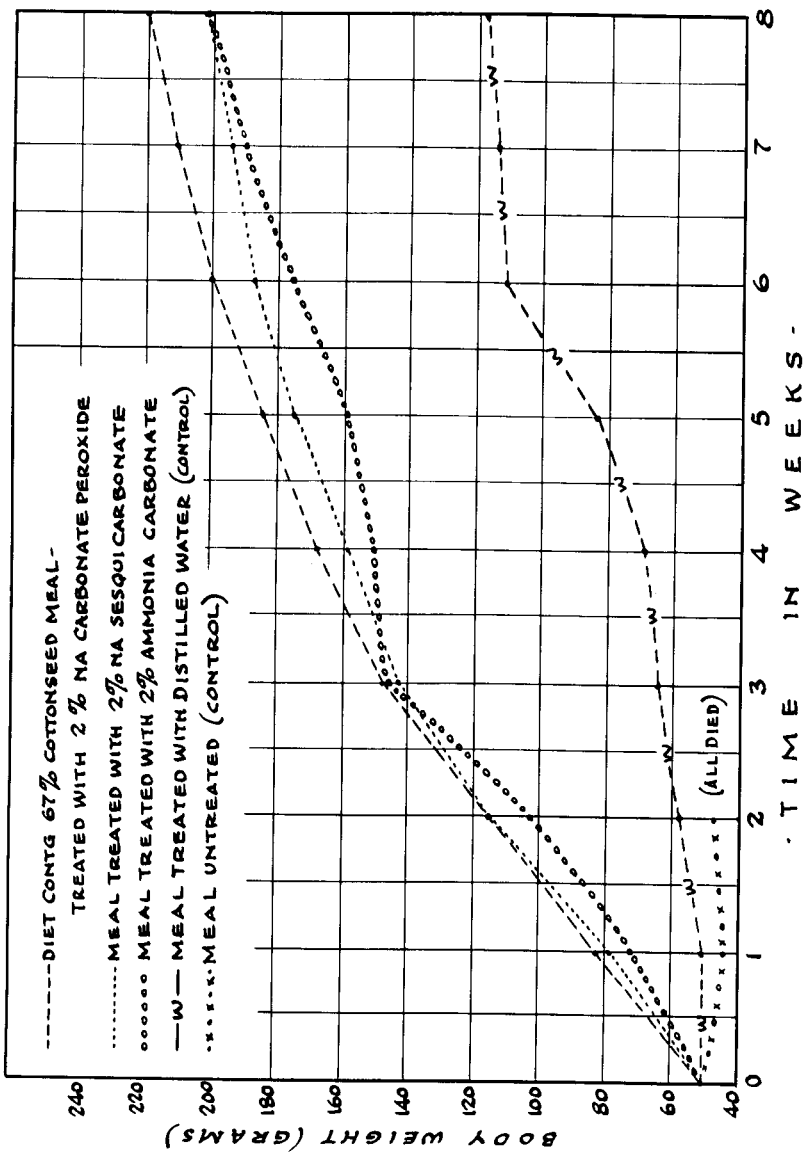

United States Patent Office 2,740,718
Patented Apr. 3, 1956

2,740,718

SEED MEAL DETOXIFICATION

Edward Eagle and Frank A. Norris, Chicago, Ill., assignors to Swift & Company, Chicago, Ill., a corporation of Illinois Application October 3, 1951, Serial No. 249,500

6 Claims. (Cl. 99—2)

This invention relates generally to an improved process of detoxifying a seed meal, and more particularly to a process which transfers a highly toxic solvent-extracted cottonseed meal into a nontoxic highly nutritious food material.

It has long been known that cottonseed meal from which the oil has been extracted by means of a hydrocarbon solvent, for example, is toxic when ingested by many species of animals for which it would otherwise serve as a very desirable food source. Cottonseed meal which has been treated by the conventional crushing operations to remove the oil, however, is known to be nontoxic and is commonly used as an animal feed material. It is generally believed that the moist heat treatment employed in cooking the cottonseed meal prior to the crushing operation is responsible for detoxifying the latter meal. When oil is to be removed from cottonseed by solvent extraction, however, it is undesirable to precook the meal. Thus, it is necessary to employ some other process for detoxifying a solvent-extracted cottonseed meal in order to make the ever increasing quantities of solvent-extracted cottonseed meal available as an animal feed material.

It is therefore an object of the present invention to provide a detoxifying process in which a normally toxic cottonseed meal is transformed into a highly nutritious nontoxic animal feed material.

It is a further object of this invention to provide a process for producing a nontoxic meal from solvent-extracted seed in a more economical manner.

An additional object of this invention is to provide a nontoxic solvent-extracted seed meal that has a higher nutritive value than seed meal produced by the conventional crushing treatment.

Other objects of this invention will be apparent from the description and claims to follow.

In accordance with the present invention it has been found that the foregoing and other objects are accomplished by treating a toxic cottonseed meal or cotton seed pigment glands with an aqueous solution of an inorganic salt, such as the alkaline inorganic salts, including the complex alkaline carbonate and alkaline carbonate salts, sodium sesquicarbonate, sodium carbonate peroxide, and ammonium carbonate.

The unusual effectiveness of the present invention is illustrated by the following results obtained on treating cottonseed pigment glands which contain all the toxic components of the cottonseed:

Three samples of the cottonseed pigment glands were prepared by the gland floatation proceess from a single lot of prime cottonseed. For each of the three samples the test preparations were made by mixing 10 grams of pigment glands with distilled water to a final volume of 100 ml. and then by suspending 10 grams of the said glands in 2 per cent aqueous sodium sesquicarbonate solution and adjusting to a final volume of 100 ml. The solutions were not heated or otherwise treated.

While it has been frequently said that cottonseed meal can be rendered nontoxic simply by reducing the gossypol content, it has been observed that in some instances there is no apparent correlation between the toxicity of the various samples of pigment glands from cottonseed meal and their content of gossypol or gossypurpurin. See Eagle et al., Arch. Biochem., vol. 18, pp. 271–277 (1948); Eagle et al., Jour. Am. Oil Chem. Soc., vol 27, pp. 300–303 (1950); and Ambrose et al., Jour. Nutrition, vol. 43, pp. 357–370 (1951). The evidence indicates that some component of cottonseed pigment glands other than or in addition to gossypol and gossypurpurin may be responsible for the toxicity of the pigment glands in the case of chickens, mice, guinea pigs, and rabbits. It therefore may not always be sufficient to rely on a chemical analysis indicating the amount of gossypol in the cottonseed meal when determining the relative toxicity of various cottonseed meals. Thus, while a chemical analysis for gossypol is the method commonly used for determining the toxicity of cottonseed meal, it is also advisable to conduct animal feeding tests when evaluating any process for detoxifying cottonseed meal.

In conducting the animal feeding tests, male rats weighing between 150 and 220 grams were fasted for 18 hours and then single doses of the foregoing unheated solutions were given by stomach tube on the basis of milligrams of pigment glands per kilogram body weight. All the rats had free access to stock diet and water after dosing. Calculations on LD values were made by the method of Reed and Muench (Am. Jour. of Hyg., vol. 27, p. 493 (1938)).

Doses of all three samples of cottonseed pigment glands which caused 50 and 100 per cent mortality when administered in distilled water were determined in the above manner. These same doses of toxic pigment glands were found to have no harmful effect when given in a 2 per cent sodium sesquicarbonate solution. The rapid onset of diarrhea reported from administration of cottonseed pigment glands occurred when distilled water was the vehicle, but no diarrhea occurred when the glands were suspended in 2 per cent sodium sesquicarbonate solution.

It is clear from the foregoing results that toxic pigment glands can be made nontoxic merely by treating with the specified salts without heating. Steaming or other heat treatment of the pigment glands is therefore not required provided the salt solution is brought directly in contact with the pigment glands. When treating cottonseed containing the toxic pigment glands wherein the glands are not freely exposed, it is advisable to process the seed so that the glands are exposed directly to the detoxifying action of the effective salts. This may be done in any suitable manner as by treating the cottonseed with steam, heating in water, drying the moistened seed, or applying a suitable reagent which causes the pigment glands in the seeds to become freely exposed. While it is generally considered desirable to add the salt prior to or at the same time as treating the cottonseed to expose the pigment glands it is possible to first treat the seed in order to expose the pigment glands and then contact the seed containing the exposed pigment glands with the specified salts.

In order to demonstrate the effectiveness of the present invention in detoxifying a seed meal containing toxic pigment glands, a quantity of air-dried, hexane-extracted cottonseed flakes which had not been heated during processing was subjected to a series of tests conducted in the following manner:

A portion of the above hexane-extracted, desolventized, and unheated cottonseed flakes was ground and incorporated in the following test diet having the specified composition:

| | Percent |
|---|---|
| Hexane-extracted cottonseed meal | 67 |
| Swift'ning | 10 |
| Jones and Foster salt mixture | 4 |
| Wilson liver powder 1:20 | 3 |
| Vitamin A and D oil (2250 U. S. P. A; 300 I. C. D) | 1 |
| Yeast A B type 300 | 1 |
| Sucrose | 14 |

It was found that the above hexane-extracted cottonseed meal containing test diet when fed to healthy Sprague-Dawley strain rats was very toxic and all rats died within 6 days. Similar results were observed when the said cottonseed meal was heated in the absence of water at 100° C. in a vacuum oven (25 inches Hg) for 6 hours and incorporated in the above diet at the same 67 per cent level.

In a subsequent test 500 grams of the foregoing toxic cottonseed meal was mixed with 250 cc. of 2 per cent sodium sesquicarbonate solution and the mixture placed in a vacuum oven at 100° C. with a vacuum of 25 inches mercury for 6 hours and the resulting thoroughly dried product ground in a Wiley mill through a 20-mesh screen. It was found that this treated cottonseed meal combined in the aforementioned test diet at the same 67 per cent level had no toxic effect on the animals and they gained weight in a normal manner.

Figure I of the drawings shows the body weight curve obtained by feeding Sprague-Dawley weanling rats the above indicated diet containing hexane-extracted cottonseed meal treated with sodium sesquicarbonate for a period of 2 weeks during which time each of the rats was weighed at daily intervals. Each point on the curves represents the average weight obtained from 4 rats.

Figure I also shows the results of feeding tests in which rats were fed the standard test diet containing 67 per cent of the same hexane-extracted cottonseed meal moistened with the same proportion of distilled water and dried in the same manner as the sodium sesquicarbonate-treated meal. From the body weight curve for the rats fed the test diet containing the meal treated with distilled water, it is clear that the meal so treated is only partially detoxified since the gain in weight is less than half that evidenced by the rats fed the diet containing the same percentage of sodium sesquicarbonate-treated meal.

Also shown in Figure I are the body weight curve of rats which were fed the same test diet formulation as above but in which the solvent-extracted meal was replaced by 67 per cent untreated hexane-extracted cottonseed, 67 per cent of the same meal dry heated, and the body weight curve of rats fed on a very high-quality stock diet which consisted of:

| | Percent |
|---|---|
| Whole ground wheat | 21 |
| Yellow corn | 13 |
| Skim milk | 15 |
| Meat and bone scrap | 18 |
| Soybean meal | 15 |
| Alfalfa leaf meal | 2 |
| Salt and yeast mixture | 2.5 |
| Liver and glandular meal | 2 |
| Wheat germ oil | 1 |
| Vitamin A & D oil (2250 U. S. P. A; 300 I. C. D) | 0.5 |
| Lard | 10 |

It is important to observe that in Figure I the slope of the body weight curve of the rats fed on the diet contained sodium sesquicarbonate-treated cottonseed meal approaches most closely that of the rats fed the above high-quality stock diet. Similar tests also indicate that rats fed the test diet containing 67 per cent sodium sesquicarbonate-treated cottonseed meal have a significantly greater growth rate than the rats fed a diet containing the same percentage of hydraulic and expeller cottonseed meal.

Figure II of the drawings shows the results of a further application of the present invention to detoxifying a highly toxic solvent-extracted cottonseed meal. In these tests eight weanling rats of the Sprague-Dawley strain per group were fed the standard test diet containing 67 per cent cottonseed meal treated in the following specified manner:

500 gram portions of the toxic hexane-extracted cottonseed meal used in the test summarized in Figure I were thoroughly moistened with 250 cc. of 2 per cent solution of sodium sesquicarbonate, sodium carbonate peroxide, ammonium carbonate, sodium hypochlorite and sodium chloride, respectively. Each of the foregoing portions of moistened seed meals was then dried in an oven at 100° C. under a vacuum of 29 inches mercury for a period of 6 hours. The dried product was thereafter ground in a Wiley mill through a 20-mesh screen and incorporated in the test diet described heretofore in connection with the data given in Figure I.

In order to provide an adequate basis for evaluating the effectiveness of the latter detoxifying treatment, there is also plotted in Figure II the body weight curves of the rats which have been fed diets containing the same amount of the untreated hexane-extracted cottonseed meal and the same amount of cottonseed meal which had been moistened with the same proportion of distilled water and thoroughly dried in 100° C. under a vacuum of 29 inches mercury. Figure II also shows the body weight curve of a group of rats which had been fed the very high-quality laboratory stock diets described heretofore.

As evidenced by the body weight curves of Figure II, treating a highly toxic hexane extracted cottonseed meal with each of the above specified chemicals renders the said meal nontoxic and makes it possible to maintain the animals in a normal, healthy state when fed a diet containing a very high level of the treated meal. It is also readily apparent from Figure II that the complex carbonate salts of an alkali metal, sodium sesquicarbonate and sodium carbonate peroxide, are the most effective materials for detoxifying solvent-extracted cottonseed meal. In addition to the above-mentioned chemicals, sodium chloride and trisodium phosphate are also effective in detoxifying a solvent-extracted cottonseed meal as described herein.

In order to determine the long-term effect of feeding animals a diet containing solvent-extracted cottonseed meal which has been treated with sodium sesquicarbonate, sodium carbonate peroxide, or ammonium carbonate, feeding tests similar to those summarized in Figure I and Figure II were conducted which extended over a period of eight weeks. The results of the latter feeding tests are summarized in the body weight curves shown in Figure III.

The same hexane-extracted cottonseed meal used in the test summarized in Figures I and II was treated in the same manner as described for the foregoing tests wherein portions of the cottonseed meal were moistened with approximately half its weight of a 2 per cent solution of sodium sesquicarbonate, sodium carbonate peroxide, and ammonium carbonate, respectively. Each of the foregoing test lots of moistened cottonseed meal was then heated in an oven at 100° C. under a vacuum of 29 inches of mercury for six hours. The dried cottonseed meal was then ground in a Wiley mill through a 20-mesh screen and was incorporated in the same test diet described heretofore in connection with the work summarized in Figures I and II. The treated cottonseed meal comprised 67 per cent by weight of the test diet.

The body weight curves obtained upon feeding weanling rats of the Sprague-Dawley strain on the above-mentioned diets for a period of 8 weeks during which the rats were weighed at least every other day show that the rats gained weight normally and were in no way detrimentally affected by consuming a diet containing the hexane-extracted cottonseed meal treated with the specified alkaline carbonate reagents. It is of particular interest to observe that the body weight curves of rats fed sodium carbonate peroxide and sodium sesquicarbonate-treated meal conform to the usual pattern of normal body weight curves. These body weight studies clearly show that a highly toxic solvent-extracted cottonseed meal may be detoxified by treating with the specified chemicals and that the solvent-extracted cottonseed meal may be used in unusually large amounts as the principal component of a highly nutritious food mixture.

In the foregoing studies the same volume of each reagent was added to the meal as a 2 per cent solution in order to provide a basis for comparing the relative effectiveness of the various reagents. It should be understood, however, that substantially smaller volumes of solution could be and preferably should be used when processing cottonseed meal commercially in order to reduce to a minimum the volume of moisture which must be removed during the drying operation. Similarly, the concentration of the reagent in the moistening solution can be varied considerably above and below the 2 per cent level. The most desirable concentration of reagent to be used will vary with the relative toxicity of the meal being treated and the particular mode of heating and drying. The optimum conditions of concentration, temperature and time of treatment for any particular meal can be readily determined by those skilled in the art in accordance with the present disclosure.

An important advantage of the present invention over those previously employed to detoxify solvent-extracted cottonseed meal resides in the extreme simplicity of the process. It will be observed that it is not necessary in practicing the present invention to subject the cottonseed pigment glands or the toxic cottonseed meal while in contact with the specified reagents to a steaming operation or to a heat treatment at a substantially elevated temperature. By eliminating prolonged heating or steaming at substantially elevated temperatures, the nutritive value of the meal is maintained at a very high level.

While the specific embodiments of the present invention as applied to detoxifying cottonseed meal described herein have used a vacuum oven for heating and drying the meal, equally effective results are obtained by heating the meal moistened with a dilute solution of the specified reagent in any of the conventional cooking apparatus used in the oil crushing industry, such as in a steam-jacketed autoclave. The meal so heated is then dried in any suitable manner, such as in a steam-jacketed vessel with an agitator therein, with or without using a vacuum in the drying apparatus.

It should also be understood that while the specific embodiments of the present invention as applied to detoxifying a solvent-extracted cottonseed meal have used a hexane-extracted cottonseed meal, any cottonseed before or after having been extracted with solvents, such as the hydrocarbon solvents and chlorinated hydrocarbon solvents, which do not render the toxic material in the pigment glands nontoxic, or after having been treated in any manner which does not render the pigment gland nontoxic, can also be effectively treated in accordance with the hereindescribed invention.

Obviously, many modifications and variations of the invention as hereinbefore set forth may be made without departing from the spirit and scope thereof, and therefore only such limitations should be imposed as are indicated in the appended claims.

We claim:

1. In a process for the preparation of feed material from cottonseed meal containing toxic pigment glands, the step of heating said meal with an aqueous solution of an inorganic salt selected from the group consisting of sodium sesquicarbonate, sodium carbonate peroxide, sodium chloride, trisodium phosphate and sodium hypochlorite whereby said glands are exposed to the solution and rendered substantially non-toxic.

2. In a process for the preparation of feed material from cottonseed meal containing toxic pigment glands, the step of heating the meal with an aqueous solution of sodium sesquicarbonate whereby said glands are exposed to the solution and rendered substantially non-toxic.

3. In a process for the preparation of feed material from cottonseed meal containing toxic pigment glands, the step of heating the meal with an aqueous solution of sodium carbonate peroxide whereby said glands are exposed to the solution and rendered substantially non-toxic.

4. In a process for the preparation of feed material from cottonseed meal containing toxic pigment glands, the step of heating the meal with an aqueous solution of sodium chloride whereby said glands are exposed to the solution and rendered substantially non-toxic.

5. In a process for the preparation of feed material from cottonseed meal containing toxic pigment glands, the step of heating meal with an aqueous solution of trisodium phosphate whereby said glands are exposed to the solution and rendered substantially non-toxic.

6. In a process for the preparation of feed material from cottonseed meal containing toxic pigment glands, the step of heating meal with an aqueous solution of sodium hypochlorite whereby said glands are exposed to the solution and rendered substantially non-toxic.

References Cited in the file of this patent

UNITED STATES PATENTS

| | | |
|---|---|---|
| 695,476 | McFarlane | Mar. 18, 1902 |
| 1,258,530 | Bryant | Mar. 5, 1918 |
| 2,458,680 | Buxton | Jan. 11, 1949 |

OTHER REFERENCES

Gallup et al.: Journal of Agricultural Research, vol. 52 (1936), pages 65–72.